United States Patent
Shiratake et al.

(10) Patent No.: US 7,487,370 B2
(45) Date of Patent: Feb. 3, 2009

(54) SEMICONDUCTOR DEVICE AND SYSTEM

(75) Inventors: Shinichiro Shiratake, Yokohama (JP);
Yukihito Oowaki, Yokohama (JP);
Hiroyuki Hara, Fujisawa (JP); Tetsuya Fujita, Kawasaki (JP); Fumitoshi Hatori, Yokohama (JP); Masataka Matsui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 11/216,018

(22) Filed: Sep. 1, 2005

(65) Prior Publication Data
US 2006/0271799 A1 Nov. 30, 2006

(30) Foreign Application Priority Data
May 24, 2005 (JP) ............................. 2005-150830

(51) Int. Cl.
*G06F 1/00* (2006.01)
(52) U.S. Cl. ..................... 713/300; 713/322; 713/323; 700/32; 700/106; 700/174; 702/182
(58) Field of Classification Search ......... 713/300–340; 365/226–229
See application file for complete search history.

(56) References Cited

U.S. PATENT DOCUMENTS

| | | | | |
|---|---|---|---|---|
| 5,097,303 | A * | 3/1992 | Taguchi | 365/149 |
| 5,367,487 | A * | 11/1994 | Yoshida | 365/189.09 |
| 5,808,494 | A * | 9/1998 | Chang et al. | 327/115 |
| 5,831,421 | A * | 11/1998 | Taira et al. | 323/314 |
| 5,903,513 | A * | 5/1999 | Itou | 365/233 |
| 6,163,493 | A * | 12/2000 | Yamagata et al. | 365/226 |
| 6,522,182 | B2 * | 2/2003 | Tomita et al. | 327/158 |
| 6,580,287 | B2 * | 6/2003 | Hsu et al. | 326/32 |
| 6,580,312 | B1 * | 6/2003 | Kim | 327/536 |
| 6,601,177 | B1 * | 7/2003 | Fujigaya et al. | 713/300 |
| 6,870,778 | B2 * | 3/2005 | Ozawa et al. | 365/189.09 |
| 6,927,605 | B2 * | 8/2005 | Fetzer et al. | 327/101 |
| 7,013,401 | B2 * | 3/2006 | Shimizu et al. | 713/322 |
| 7,093,143 | B2 * | 8/2006 | Ito et al. | 713/300 |
| 7,222,244 | B2 * | 5/2007 | Kawahara et al. | 713/300 |
| 7,269,780 | B2 * | 9/2007 | Arima et al. | 714/764 |
| 2004/0113495 | A1 * | 6/2004 | Matsuo et al. | 307/29 |
| 2004/0199803 | A1 * | 10/2004 | Suzuki et al. | 713/400 |

FOREIGN PATENT DOCUMENTS

| | | |
|---|---|---|
| JP | 11-224141 | 8/1999 |
| JP | 2002-229690 | 8/2002 |

* cited by examiner

*Primary Examiner*—Nitin C Patel
*Assistant Examiner*—Mohammed H Rehman
(74) *Attorney, Agent, or Firm*—Oblon, Spivak, McClelland, Maier & Neustadt, P.C.

(57) ABSTRACT

According to the present invention, there is provided a semiconductor device including a power supply circuit which receives an external power supply voltage supplied, and outputs an internal power supply voltage not higher than the external power supply voltage; a system module which receives the internal power supply voltage, and performs a predetermined operation; and a performance monitor circuit which measures a processing speed of said system module when the internal power supply voltage is applied, and, on the basis of the processing speed, outputs a first control signal which requests to set the external power supply voltage at a first level, and a second control signal which requests said power supply circuit to set the internal power supply voltage at a second level. The power supply circuit outputs the internal power supply voltage having the second level on the basis of the second control signal applied thereto.

2 Claims, 10 Drawing Sheets

| VG | RQ | CTL | VEX | VIN |
|---|---|---|---|---|
| 1.25V | 0 | OFF | 1.50V | 1.10V |
| 1.30V | 0 | OFF | 1.50V | 1.15V |
| 1.35V | 0 | OFF | 1.50V | 1.20V |
| 1.40V | 0 | OFF | 1.50V | 1.25V |
| 1.45V | 0 | OFF | 1.50V | 1.30V |
| — | 3 | ON | 1.35V | 1.35V |
| — | 2 | ON | 1.40V | 1.40V |
| — | 1 | ON | 1.45V | 1.45V |
| — | 0 | ON | 1.50V | 1.50V |

SEMICONDUCTOR DEVICE AND SYSTEM

CROSS REFERENCE TO RELATED APPLICATION

This application is based upon and claims benefit of priority under 35 USC §119 from the Japanese Patent Application No. 2005-150830, filed on May 24, 2005, the entire contents of which are incorporated herein by reference.

BACKGROUND OF THE INVENTION

The present invention relates to a semiconductor device and system.

A system on chip (to be referred to as an SoC hereinafter) contains a plurality of system modules having different calculating functions, and receives an externally supplied power supply voltage VEX.

The system modules are connected by a system bus, and exchange data via the system bus. The system modules also exchange data with devices outside the chip via an input/output interface circuit.

Assume that the SoC contains two system modules 1 and 2, and the processing speed of system module 2 is higher than that of system module 1.

This SoC has, e.g., two power supply circuits 1 and 2, and power supply circuit 1 generates a predetermined internal power supply voltage (low voltage) VIN1 as the operating voltage of system module 1.

Similarly, power supply circuit 2 generates a predetermined internal power supply voltage (high voltage) VIN2 as the operating voltage of system module 2.

The internal power supply voltage VIN2 is higher than the internal power supply voltage VIN1 because system module 2 is required to have a processing speed higher than that of system module 1.

That is, the higher the power supply voltage, the higher the transmission rate of a logic circuit. Therefore, system module 2 requires a higher internal power supply voltage VIN2 in order to achieve a higher processing speed.

On the other hand, the lower the internal power supply voltage VIN, the smaller the power consumption of the module. Accordingly, the power consumption of the whole chip can be minimized by optimizing the internal power supply voltage VIN such that a speed equal to or slightly higher than the necessary processing speed is realized.

Conventionally, however, power supply control of the semiconductor device is performed as follows.

N- and P-channel MOS transistors are connected in parallel between an external terminal for inputting the external power supply voltage VEX and an internal power supply voltage output terminal for generating the internal power supply voltage VIN.

When the N-channel MOS transistor is turned off and the P-channel MOS transistor is turned on, a voltage sufficiently higher than the threshold voltage can be applied to the gate-to-source path by applying 0 V to the gate of the P-channel MOS transistor. As a consequence, the internal power supply voltage VIN has substantially the same electric potential as the external power supply voltage VEX.

The control is as follows, however, when the P-channel MOS transistor is turned off and only the N-channel MOS transistor is turned on.

When the gate of the N-channel MOS transistor is controlled by a gate, potential VG, the internal power supply voltage VIN is controlled such that $VIN = VG - VTH < VEX$ where VTH is the threshold voltage of the N-channel MOS transistor, regardless of the external power supply voltage VEX.

Note that to stably generate the internal power supply voltage VIN lower than the external power supply voltage VEX by using the N-channel MOS transistor, the internal power supply voltage VIN must be lower by about 200 mV or more than the external power supply voltage VEX, since a resistance exists between the source and drain of the N-channel MOS transistor.

When the external power supply voltage VEX is, e.g., 1.5 V, therefore, the internal power supply voltage VIN is 1.3 V if the N-channel MOS transistor alone is turned on.

Consequently, it is possible to generate only two types of voltages, i.e., 1.5 V when the P-channel MOS transistor is turned on, and 1.3 V or less when the N-channel MOS transistor alone is turned on.

Accordingly, if the voltage at which the processing speed of the system is maintained and the power consumption is optimum is 1.4 V, the power consumption cannot be minimized because no such voltage can be generated.

In addition, the necessary internal power supply voltage of the system module changes in accordance with, e.g., the operation environment such as the temperature and variations in process parameters. Since only two different internal power supply voltages can be generated, the internal power supply voltage is determined in accordance with conditions which maximize the processing speed of the system module. This poses the problem that the electric power is wastefully consumed.

The following is a reference disclosing the power supply control technique in the conventional semiconductor device.

Reference 1: Japanese Patent Laid-Open No. 11-224141

SUMMARY OF THE INVENTION

According to one aspect of the invention, there is provided a semiconductor device comprising:

a power supply circuit which receives an external power supply voltage supplied, and outputs an internal power supply voltage not higher than the external power supply voltage;

a system module which receives the internal power supply voltage, and performs a predetermined operation; and a performance monitor circuit which measures a processing speed of said system module when the internal power supply voltage is applied, and, on the basis of the processing speed, outputs a first control signal which requests to set the external power supply voltage at a first level, and a second control signal which requests said power supply circuit to set the internal power supply voltage at a second level, wherein said power supply circuit outputs the internal power supply voltage having the second level on the basis of the second control signal applied thereto.

According to one aspect of the invention, there is provided a semiconductor device comprising:

a first power supply circuit which receives an external power supply voltage supplied, and outputs a first internal power supply voltage not higher than the external power supply voltage;

a second power supply circuit which receives the external power supply voltage supplied, and outputs a second internal power supply voltage not higher than the external power supply voltage;

a first system module which receives the first internal power supply voltage, and performs a predetermined operation;

a second system module which receives the second internal power supply voltage, and outputs a processing speed control signal for requesting a processing speed to be realized by said first system module;

a first performance monitor circuit which measures a processing speed of said first system module when the first internal power supply voltage is applied, and outputs a (1A)th control signal which requests to set the external power supply voltage at a (1A)th level, and a (2A)th control signal which requests said first power supply circuit to set the first internal power supply voltage at a (2A)th level, such that the measured processing speed is not lower than the processing speed requested by the processing speed control signal;

a second performance monitor circuit which measures a processing speed of said second system module when the second internal power supply voltage is applied, and, on the basis of the measured processing speed, outputs a (1B)th control signal which requests to set the external power supply voltage at a (1B)th level, and a (2B)th control signal which requests said first power supply circuit to set the second internal power supply voltage at a (2B)th level; and a selector which receives the (1A)th and (2A)th control signals, selects one of the (1A)th and (2A)th control signals which requests a higher external power supply voltage, and outputs the selected control signal as a first control signal, wherein said first power supply circuit outputs the first internal power supply voltage having the (2A)th level on the basis of the (2A)th control signal applied thereto, and said second power supply circuit outputs the second internal power supply voltage having the (2B)th level on the basis of the (2B)th control signal applied thereto.

According to one aspect of the invention, there is provided a semiconductor device comprising:

a power supply circuit which receives an external power supply voltage supplied, and outputs an internal power supply voltage not higher than the external power supply voltage;

a system module which receives the internal power supply voltage, performs a predetermined operation by executing an externally supplied instruction, and outputs a processing speed control signal for setting a processing speed necessary to execute the instruction; and performance monitor circuit which measures a processing speed of said system module when the internal power supply voltage is applied, and outputs a first control signal which requests to set the external power supply voltage at a first level, and a second control signal which requests said power supply circuit to set the internal power supply voltage at a second level, such that the measured processing speed is not lower than the processing speed set by the processing speed control signal, wherein said power supply circuit outputs the internal power supply voltage having the second level on the basis of the second control signal applied thereto.

DETAILED DESCRIPTION OF THE INVENTION

Embodiments of the present invention will be explained below with reference to the accompanying drawings.

(1) FIRST EMBODIMENT

Figure 1:
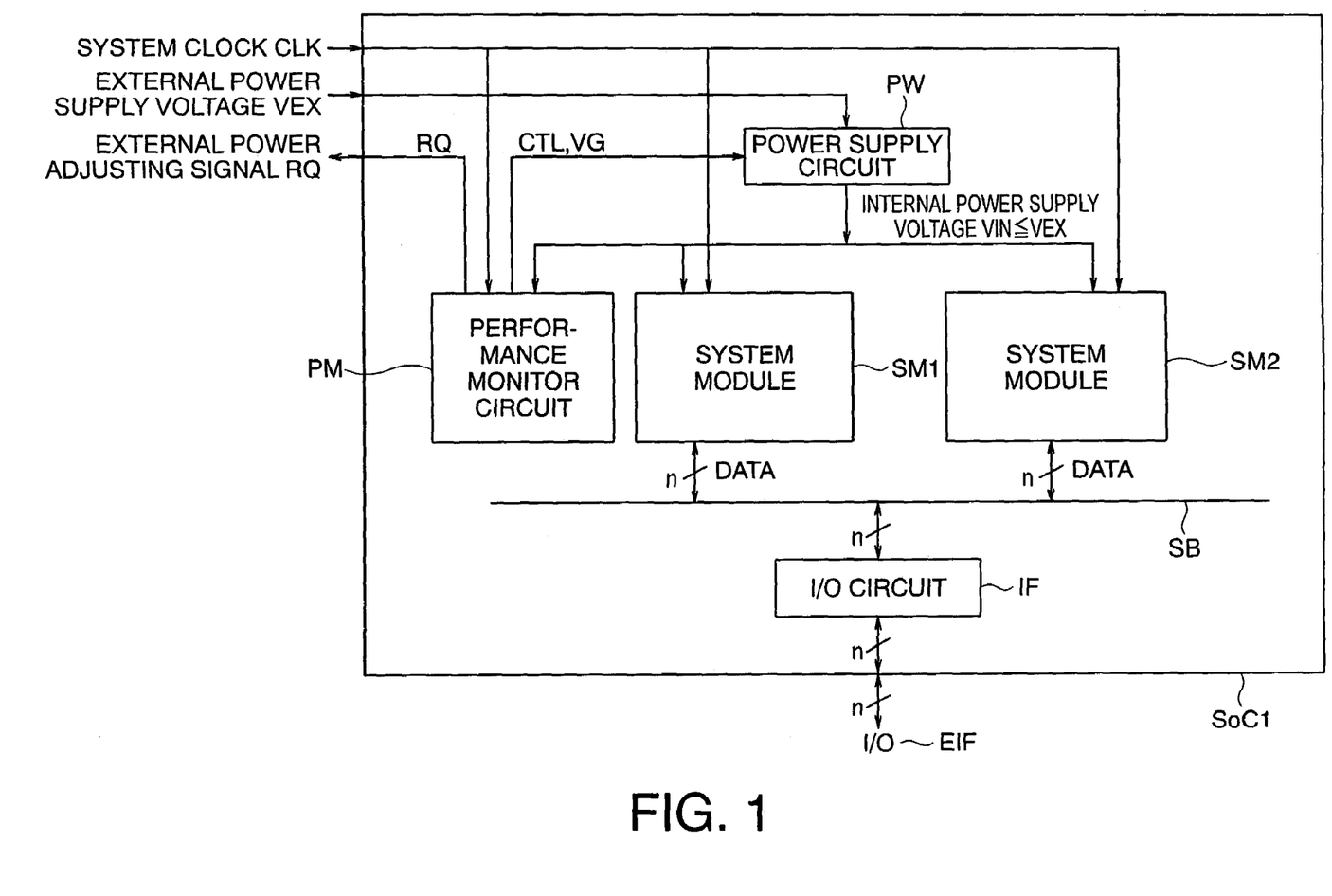
FIG. 1 is a block diagram showing the arrangement of a semiconductor device according to the first embodiment of the present invention.

FIG. 1 shows the circuit configuration of a semiconductor device SoC1 according to the first embodiment of the present invention.

In the first embodiment, a one-chip semiconductor device SoC1 as an SoC device contains two system modules SM1 and SM2, an input/output interface (to be referred to as I/O hereinafter) circuit IF, a power supply circuit PW, and performance monitor circuit PM, and receives an external power supply voltage VEX and system clock CLK.

The system modules SM1 and SM2 incorporate different arithmetic circuits, and have different calculating functions.

The power supply circuit PW receives the external power supply voltage VEX, and generates an internal power supply voltage (system module operating voltage) VIN to be supplied to the system modules SM1 and SM2 and performance monitor circuit PM.

The performance monitor circuit PW is equivalent to a processing speed measurement circuit, and monitors the performances of the system modules SM1 and SM2 by receiving the internal power supply voltage VIN and system clock CLK. More specifically, the performance monitor circuit PW measures the processing speeds of internal logic circuits of the system modules SM1 and SM2 when the internal power supply voltage VIN is supplied. The performance monitor circuit PW generates and outputs internal power control signals CTL and VG for controlling the level of the internal power supply voltage VIN generated by the power supply circuit PW, and an external power adjusting signal RQ for requesting adjustment of the external power supply voltage VEX.

The I/O circuit IF controls data transfer between the system modules SM1 and SM2 connected by a system bus SB, and data transfer with respect to another I/O circuit IF of an external device.

Figure 2:
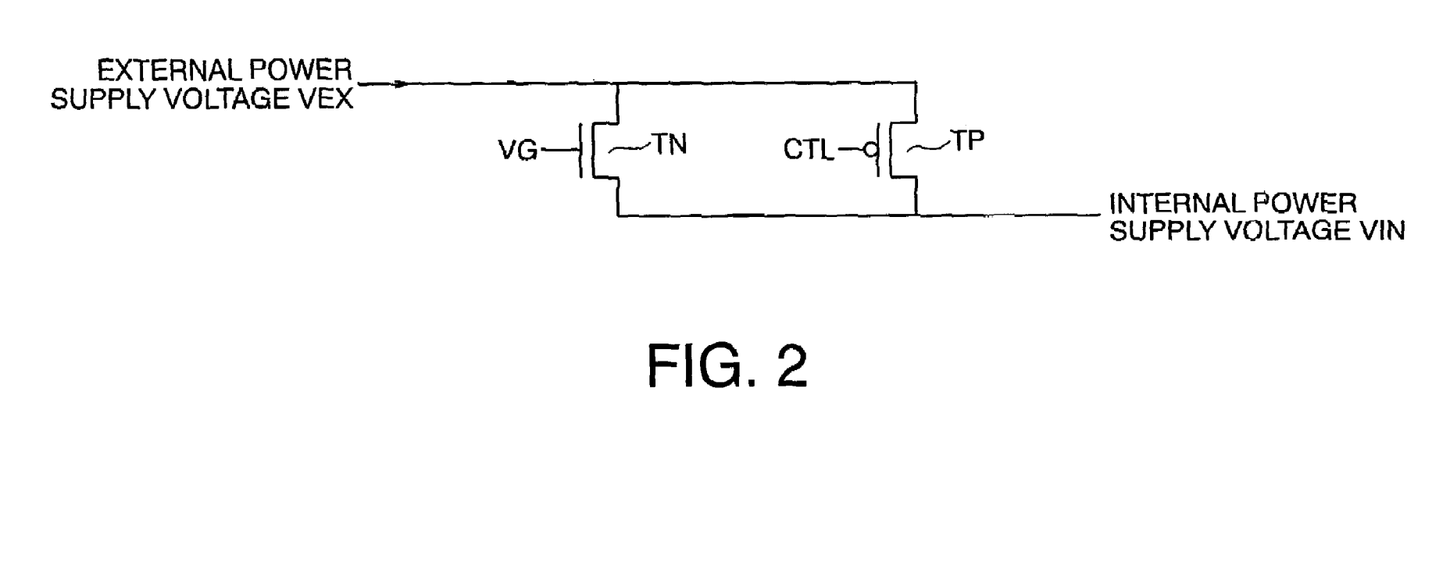
FIG. 2 is a circuit diagram showing the arrangement of a power supply circuit of the semiconductor device.

FIG. 2 shows an example of a practical circuit configuration of the power supply circuit PW.

The drain and source of an N-channel MOS transistor TN and the source and drain of a P-channel MOS transistor TP are connected in parallel between a terminal for inputting the external power supply voltage VEX and a terminal for outputting the internal power supply voltage VIN. The internal power control signal VG is input as a gate voltage to the gate of the N-channel MOS transistor TN. The internal power control signal CTL is input as a gate voltage to the gate of the P-channel MOS transistor TP. In this manner, ON/OFF of each transistor is controlled.

The internal power supply voltage VIN and system clock CLK are supplied to the system modules SM1 and SM2, and their built-in logic circuits operate and output data.

Figure 3:
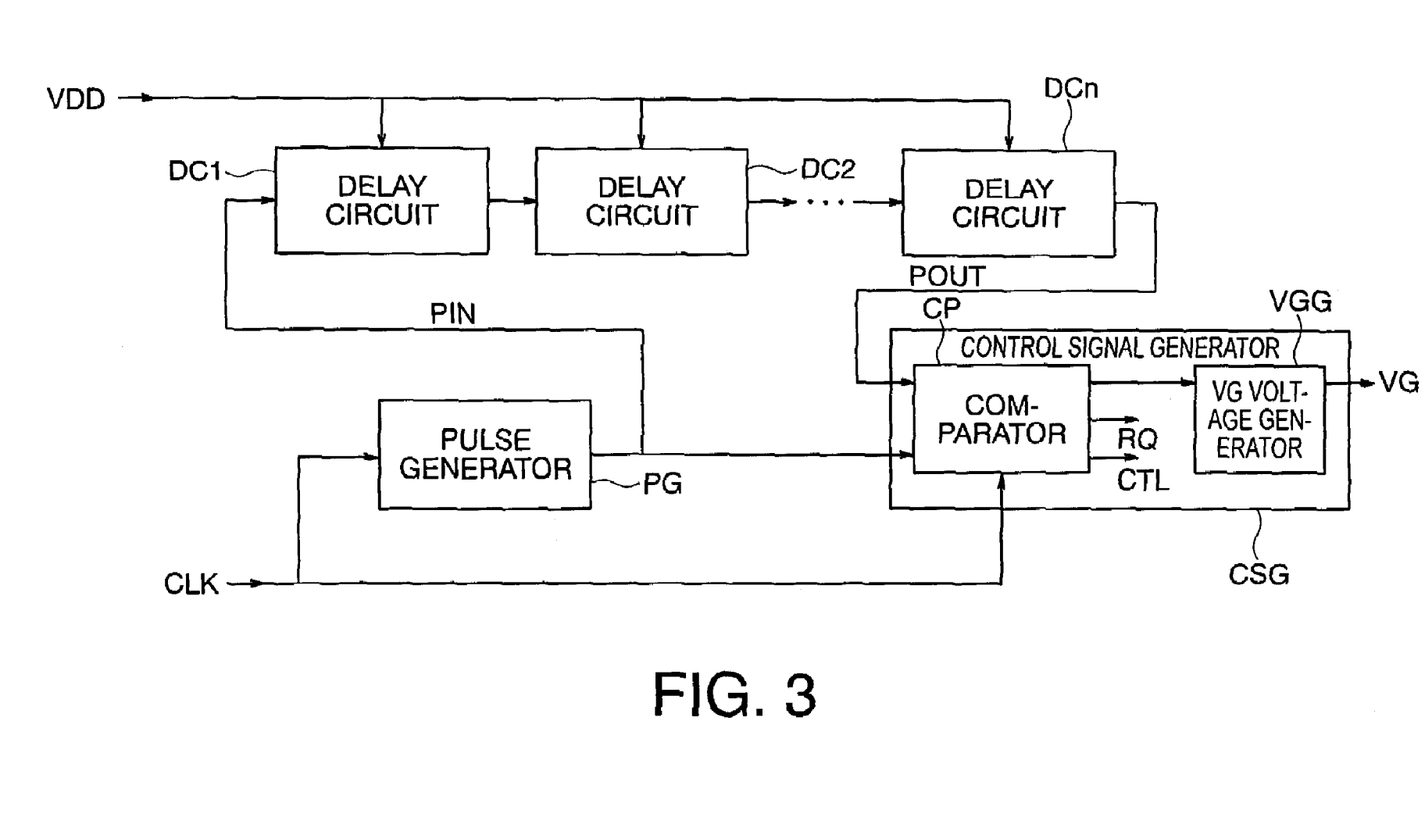
FIG. 3 is a circuit diagram showing the arrangement of a performance monitor circuit of the semiconductor device.

FIG. 3 shows a practical circuit configuration of the performance monitor circuit PM.

The performance monitor circuit PM has a pulse generator PG, n (n is an integer of 2 or more) delay circuits DC1, DC2, ..., DCn, and a control signal generator CSG which includes a comparator CP and VG voltage generator VGG.

The pulse generator PG generates an input pulse PIN on the basis of the system clock CLK.

The delay circuits DC1, DC2, ..., DCn are arrangements equivalent to at least some circuit elements contained in the system modules SM1 and SM2. The delay circuits DC1, DC2, ..., DCn receive the input pulse PIN, sequentially delay it, and generate an output pulse POUT. The delay time produced by the delay circuits DC1, DC2, ..., DCn is set at a value corresponding to the internal signal transmission rates of the system modules SM1 and SM2.

On the basis of the result of comparison of the input pulse PIN and output pulse POUT, the comparator CP generates and outputs signals for generating the external power adjusting signal RQ, internal power control signal CTL, and internal power control signal VG.

Figure 4:
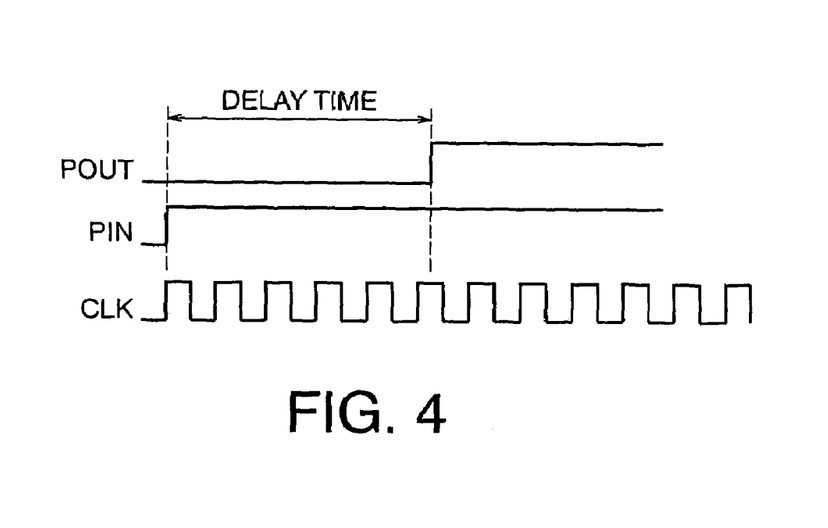
FIG. 4 is a timing chart showing the waveforms of signals in the performance monitor circuit.

More specifically, as shown in FIG. 4, the comparator CP counts, by the number of the system clocks CLK, the time difference between the input timing of the input pulse PIN and the supply timing of the output pulse POUT, and measures the delay time on the basis of the count. On the basis of the difference between a preset reference time and the measured delay time, the comparator CP outputs the external power adjusting signal RQ and internal power control signal CTL to be applied to the power supply circuit PW.

The VG voltage generator VGG generates and outputs the internal power control signal VG on the basis of the output from the comparator CP.

If the delay is large, the performance monitor circuit PM having the above arrangement raises the internal power supply voltage VIN in order to increase the operating speed. If the delay is small, the performance monitor circuit PM lowers the internal power supply voltage VIN in order to suppress unnecessary power consumption.

For example, if the temperature rises, the drivability of transistors contained in the delay circuits DC1, DC2, ..., DCn deteriorate, and this increases the delay time. In response to this increase, the performance monitor circuit PM raises the internal power supply voltage VIN in order to maintain the operating speed constant.

The external power adjusting signal RQ is output outside the chip in order to request, e.g., a central control device which controls the whole system including the semiconductor device SoC1, to adjust the external power supply voltage VEX.

In this embodiment, the external power adjusting signal RQ is made up of two bits in order to transmit four types of requests to the system.

That is, the external power adjusting signal RQ functions as a signal for requesting, e.g., 1.5 V as a basic power supply voltage of the system, and also requesting the system to lower the external power supply voltage VEX to be applied to the semiconductor device SoC1 to three stages, i.e., 1.45, 1.40, and 1.35 V.

In addition, the internal power control signals VG and CTL are applied to the gate of the N-channel MOS transistor TN and the gate of the P-channel MOS transistor TP, respectively, in the power supply circuit PW shown in FIG. 2.

Figure 5:
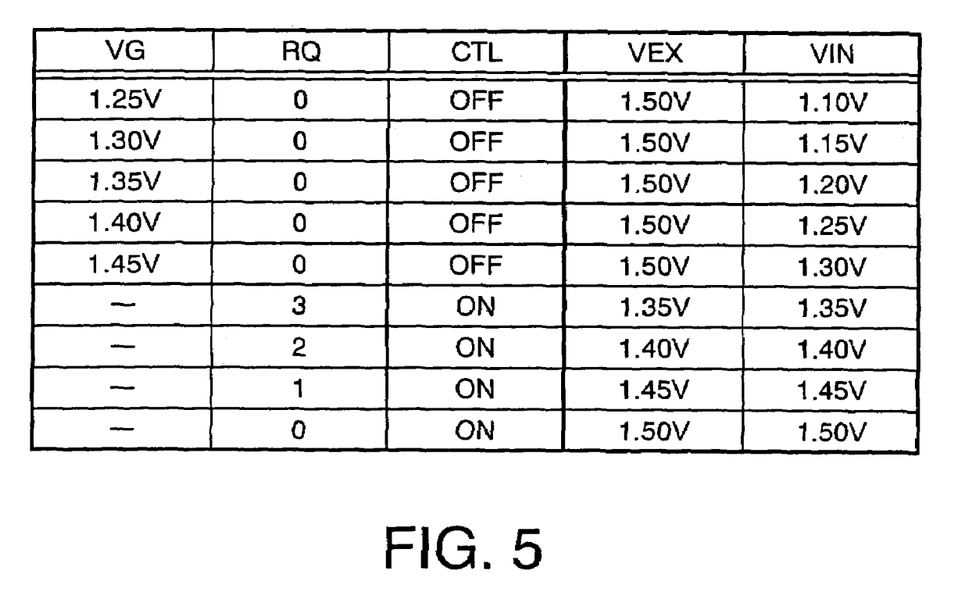
FIG. 5 is a view for explaining the relationship between an external power supply voltage, an internal power supply voltage, and control signals in the semiconductor device.

FIG. 5 shows the relationship between the internal power control signals VG and CTL, external power adjusting signal RQ, external power supply voltage VEX, and internal power supply voltage VIN.

First, when the external power adjusting signal RQ is OFF (the logic value is "0"), the system supplies 1.50 V as the external power supply voltage VEX.

Assume that a (high-level) signal for turning off the P-channel MOS transistor is applied to it as the gate voltage CTL. In this case, the gate voltage of the N-channel MOS transistor is controlled by the internal power control signal VG, thereby dropping the external power supply voltage VEX.

When gate voltage VG=1.25 V is applied, the internal power supply voltage VIN decreases by 150 mV to become 1.10 V.

Likewise, when gate voltage VG=1.30 V is applied, the internal power supply voltage VIN is 1.15 V, when gate voltage VG=1.35 V is applied, the internal power supply voltage VIN is 1.20 V, when gate voltage VG=1.40 V is applied, the internal power supply voltage VIN is 1.25 V, and when gate voltage VG=1.45 V is applied, the internal power supply voltage VIN is 1.30 V.

If the P-channel MOS transistor TP is turned off and ON/OFF of only the N-channel MOS transistor TN is controlled, it is impossible to stably generate an internal power supply voltage VIN of 1.3 V or more, which is lower by 200 mV than external power supply voltage VEX=1.5 V.

When an internal power supply voltage VIN of 1.35 to 1.5 V is necessary, therefore, the internal power control signal CTL is enabled to turn on the P-channel MOS transistor TP. In this case, the N-channel MOS transistor TN having an ON resistance higher than that of the P-channel MOS transistor TP is turned off.

Additionally, the external power adjusting signal RQ is used to request the system to decrease the external power supply voltage VEX to an appropriate voltage.

This makes it possible to output the internal power supply voltage VIN which is substantially the same as the external power supply voltage VEX.

That is, internal power supply voltage VIN=1.35 to 1.50 V can be obtained by adjusting the external power supply voltage VEX between 1.35 and 1.50 V for every 50 mV by using the external power adjusting signal RQ.

In the first embodiment, even when the processing speeds of the system modules SM1 and SM2 change owing to an external factor such as the temperature or process condition, the performance monitor circuit monitors the processing speeds, and, in accordance with the monitoring results, the optimum internal power supply voltage is generated by adjusting the applied external power supply voltage, or by changing the external power supply voltage by outputting a control signal to the system. Consequently, it is possible to allow the processing speeds to satisfy the performance requirements of the chip, and minimize the power consumption.

(2) SECOND EMBODIMENT

Figure 6:
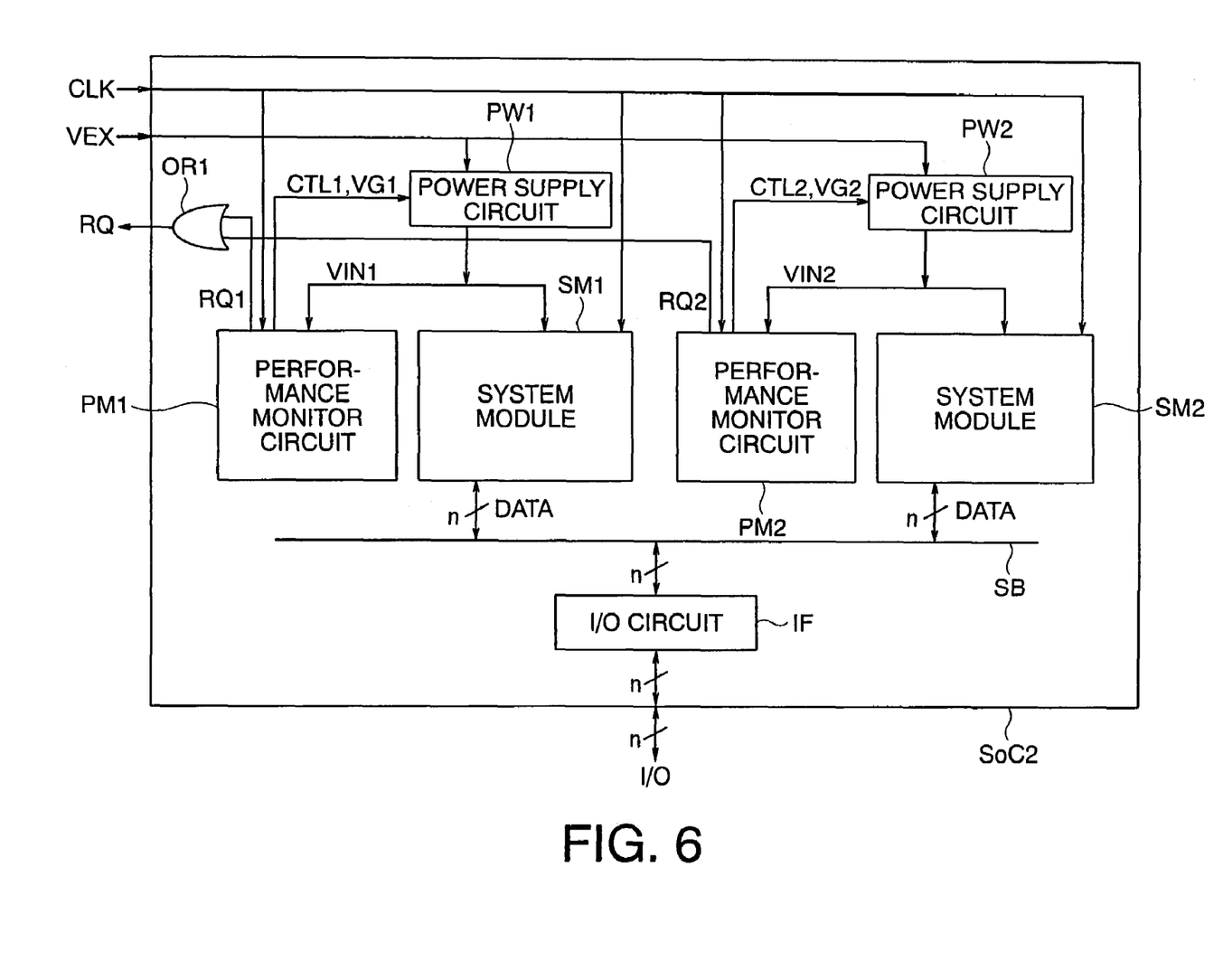
FIG. 6 is a block diagram showing the arrangement of a semiconductor device according to the second embodiment of the present invention.

A semiconductor device SoC2 according to the second embodiment of the present invention will be described below with reference to FIG. 6 showing the arrangement of the device. In the first embodiment, the power supply circuit PW and performance monitor circuit PM are assigned in common to the two system modules SM1 and SM2. In the second embodiment, however, power, supply circuits PW1 and PW2 and performance monitor circuits PM1 and PM2 are independently assigned to system modules SM1 and SM2, respectively.

The power supply circuit PW1 generates a power supply voltage VIN1 by receiving an external power supply voltage VEX from the outside and internal power control signals CTL1 and VG1 from the performance monitor circuit PM1, and outputs the power supply voltage VIN1 to the system module SM1 and performance monitor circuit PM1.

Similarly, the power supply circuit PW2 generates a power supply voltage VIN2 by receiving the external power supply voltage VEX from the outside and internal power control signals CTL2 and VG2 from the performance monitor circuit PM2, and outputs the power supply voltage VIN2 to the system module SM2 and performance monitor circuit PM2.

The operations of the performance monitor circuits PM1 and PM2 and power supply circuits PW1 and PW2 are the same as the performance monitor circuit PM and power supply circuit PW in the first embodiment, so an explanation thereof will be omitted.

In the first embodiment, the external power adjusting signal RQ output from the performance monitor circuit PM is directly output outside the device and used to change the external power supply voltage VEX. In the second embodiment, however, external power adjusting signals RQ1 and RQ2 output from the performance monitor circuits PM1 and PM2 are ORed by an OR circuit OR1 equivalent to a selector, and output outside as an external power adjusting signal RQ.

That is, of the external power adjusting signals RQ1 and RQ2, one requiring a high external power supply voltage VEX is output outside as the external power adjusting signal RQ.

This is so in order to avoid an event in which the external power supply voltage VEX is determined in accordance with one of the two system modules SM1 and SM2 which requires a low voltage, and the requirements of the processing speed of the other system module cannot be satisfied any longer.

When the external power supply voltage VEX is determined in accordance with a system module requiring a high voltage, a system module requiring a low voltage consumes electric power more than necessary. However, all system modules must satisfy necessary processing speeds, so this is given priority.

In the second embodiment, internal power supply voltages VIN1 and VIN2 are independently controlled by the performance monitor circuits PM1 and PM2, respectively.

If circuits contained in the system modules SM1 and SM2 are different, the internal signal transmission rates are also different. Therefore, the power consumption of the semiconductor device SoC2 as a whole can be reduced by controlling the operating voltage of each system module.

This embodiment can implement the semiconductor device SoC2 in which the processing speeds of the system modules SM1 and SM2 meet the performance requirements, an optimum internal power supply voltage VIN is independently and automatically generated such that the power consumption is minimized, and, if it is necessary to adjust the external power supply voltage VEX in order to realize a more optimum voltage, the external power adjusting signal RQ for requesting a change of the external power supply voltage VEX is output outside.

(3) THIRD EMBODIMENT

Figure 7:
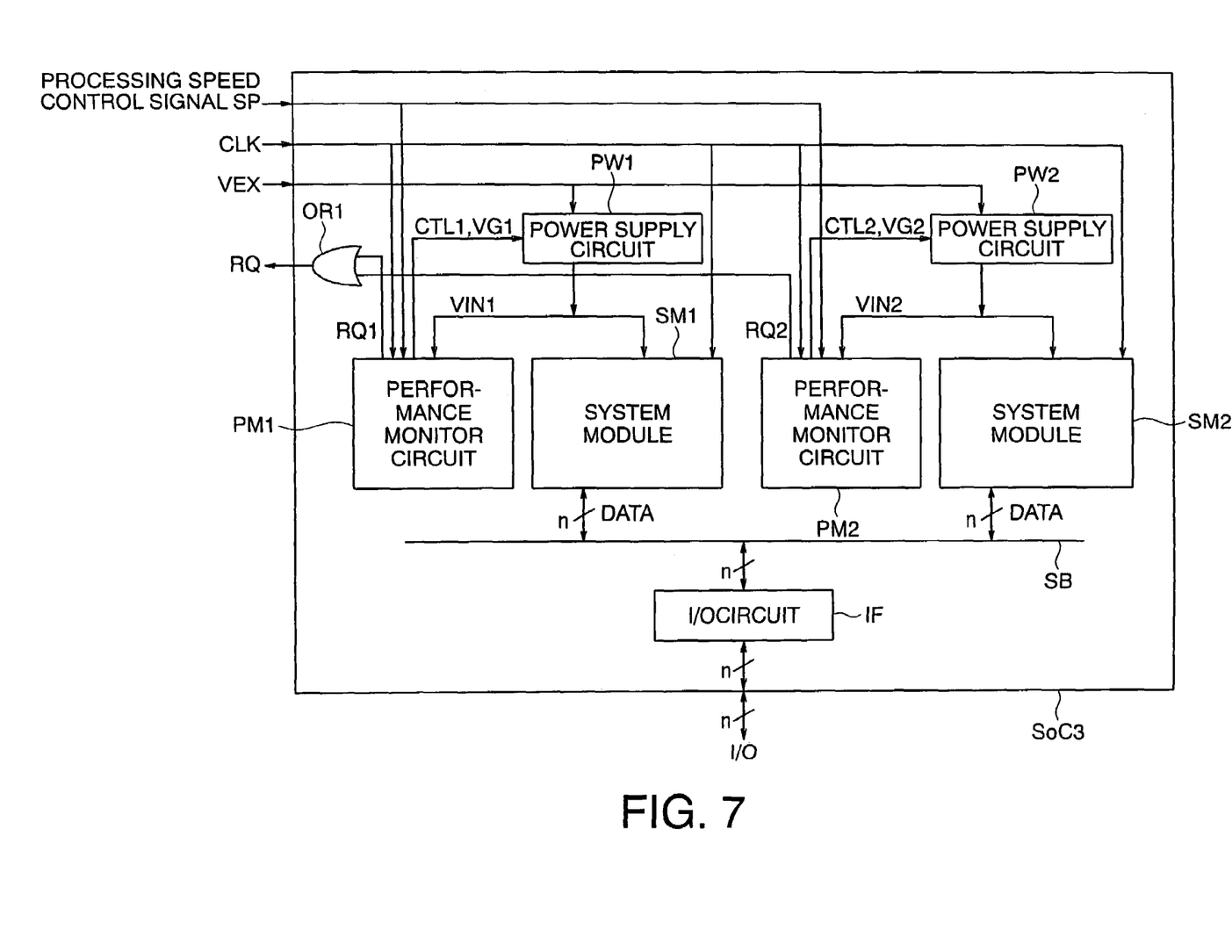
FIG. 7 is a block diagram showing the arrangement of a semiconductor device according to the third embodiment of the present invention.

FIG. 7 shows the arrangement of a semiconductor device SoC3 according to the third embodiment of the present invention.

The third embodiment differs from the second embodiment in that a processing speed control signal SP is externally applied to the semiconductor device SoC3.

The processing speed control signal SP is applied to each of performance monitor circuits PM1 and PM2.

The performance monitor circuits PM1 and PM2 compare the processing speed set in the processing speed control signal SP with the measured processing speeds, and output internal power control signals VG1 and CTL1 and an external power adjusting signal RQ1, and internal power control signals VG2 and CTL2 and an external power adjusting signal RQ2, respectively, so that the measured processing speeds are equal to or higher than the set processing speed.

If the processing speed required of the semiconductor device SoC3 is not high, the processing speed control signal SP is set at, e.g., low level. If the processing speed required of the semiconductor device SoC3 is high, the processing speed control signal SP is set at, e.g., high level.

Note that in this embodiment, the processing speed control signal SP has one bit, i.e., high level or low level. However, the processing speed control signal SP may also have two or more bits and request a plurality of stages of processing speeds.

On the basis of the processing speed control signal SP, the performance monitor circuits PM1 and PM2 control power supply circuits PW1 and PW2 to generate appropriate internal power supply voltages VIN1 and VIN2, so that system modules SM1 and SM2 can respectively achieve necessary processing speeds.

Accordingly, even if the required external condition such as the temperature or process remains the same, when the processing speed control signal SP is high level, the internal power supply voltages VIN1 and VIN2 are controlled to be higher than that when the processing speed control signal SP is low level.

(4) FOURTH EMBODIMENT

Figure 8:
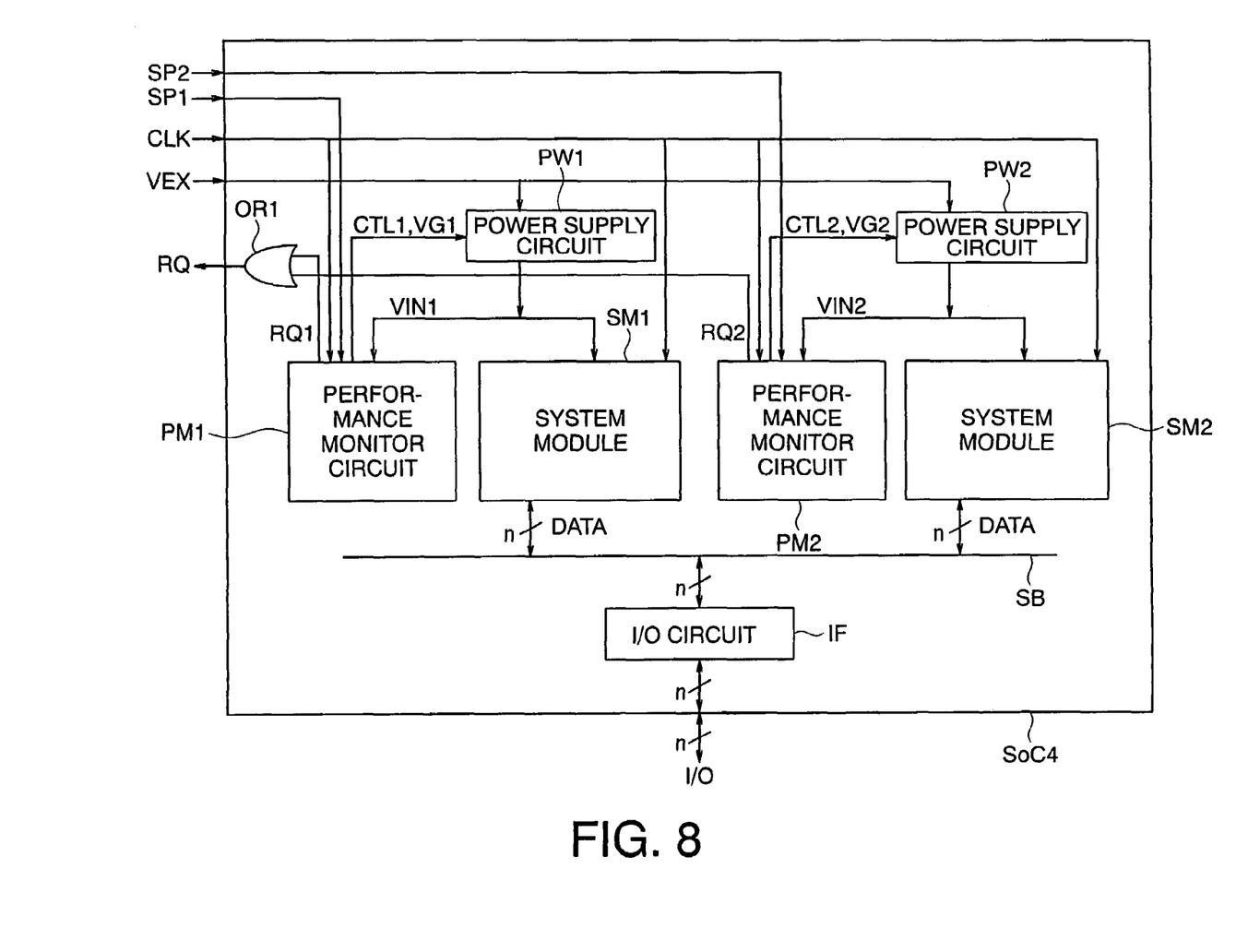
FIG. 8 is a block diagram showing the arrangement of a semiconductor device according to the fourth embodiment of the present invention.

FIG. 8 shows the arrangement of a semiconductor device SoC4 according to the fourth embodiment of the present invention.

The fourth embodiment differs from the third embodiment in that processing speed control signals SP1 and SP2 are individually applied to system modules SM1 and SM2, respectively.

The system modules SM1 and SM2 are so designed as to perform calculations unique to the individual modules.

Therefore, the processing speed of the system module SM1 is sometimes required to be higher than that of the system module SM2 in a certain period.

To flexibly control a situation like this, an external central control device or the like which controls the semiconductor device SoC4 applies the different processing speed control signals SP1 and SP2 to the system modules SM1 and SM2, respectively, thereby generating optimum internal power supply voltages VIN.

(5) FIFTH EMBODIMENT

Figure 9:
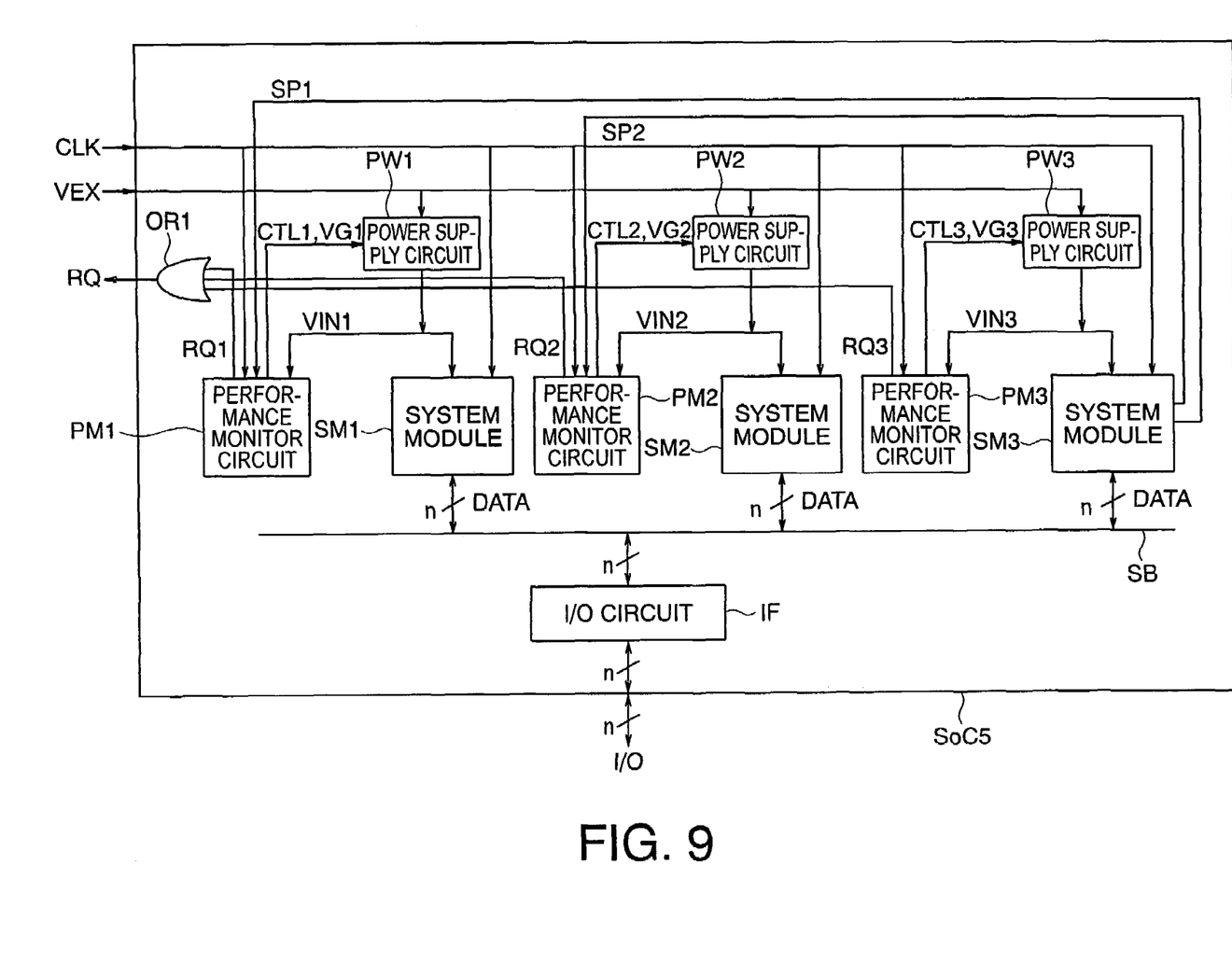
FIG. 9 is a block diagram showing the arrangement of a semiconductor device according to the fifth embodiment of the present invention.

A semiconductor device SoC5 according to the fifth embodiment of the present invention will be described below with reference to FIG. 9.

In the third or fourth embodiment, the processing speed control signal SP or the processing speed control signals SP1 and SP2 are supplied to the system modules SM1 and SM2 from an external device.

In the fifth embodiment, however, processing speed control signals SP1 and SP2 for system modules SM1 and SM2, respectively, are generated by a third system module SM3 incorporated into the semiconductor device SoC5.

The system module SM3 executes commands applied to the semiconductor device SoC5, and distributes necessary calculations to the system module SM1 and SM2 in accordance with the types of applied commands. Therefore, processing speeds required of the system modules SM1 and SM2 are controlled by the processing speed control signals SP1 and SP2, respectively, in accordance with distributed commands.

That is, if the processing speeds of the system modules SM1 and SM2 must be high, these processing speeds are increased by setting the processing speed control signals SP1 and SP2 at high level.

Accordingly, when executing a large number of commands which activate, e.g., the system module SM1, the system module SM3 raises an internal power supply voltage VIN1 by setting the processing speed control signal SP1 at high level. When executing not many commands which activate the system module SM2, the system module SM3 sets the processing speed control signal SP2 at low level, thereby decreasing the required processing speed and lowering an applied internal power supply voltage VIN2.

Also, an internal power supply voltage VIN3 of the system module SM3 is generated by a power supply circuit PW3 controlled by a performance monitor circuit PM3, and is so controlled that the power consumption is always minimized.

It takes several μsec to several ten μsec to switch the processing speed control signals SP to change the internal power supply voltages VIN1 and VIN2 of the system modules SM1 and SM2. For example, it is unpreferable to change the values of the processing speed control signals SP1 and SP2 whenever system clocks of several MHz to several ten GHz are switched.

It is, therefore, favorable to perform control by which the processing speed control signals SP1 and SP2 are changed in accordance with the state of a command which is executed between several ten clocks and several 100,000 clocks.

(6) SIXTH EMBODIMENT

Figure 10:
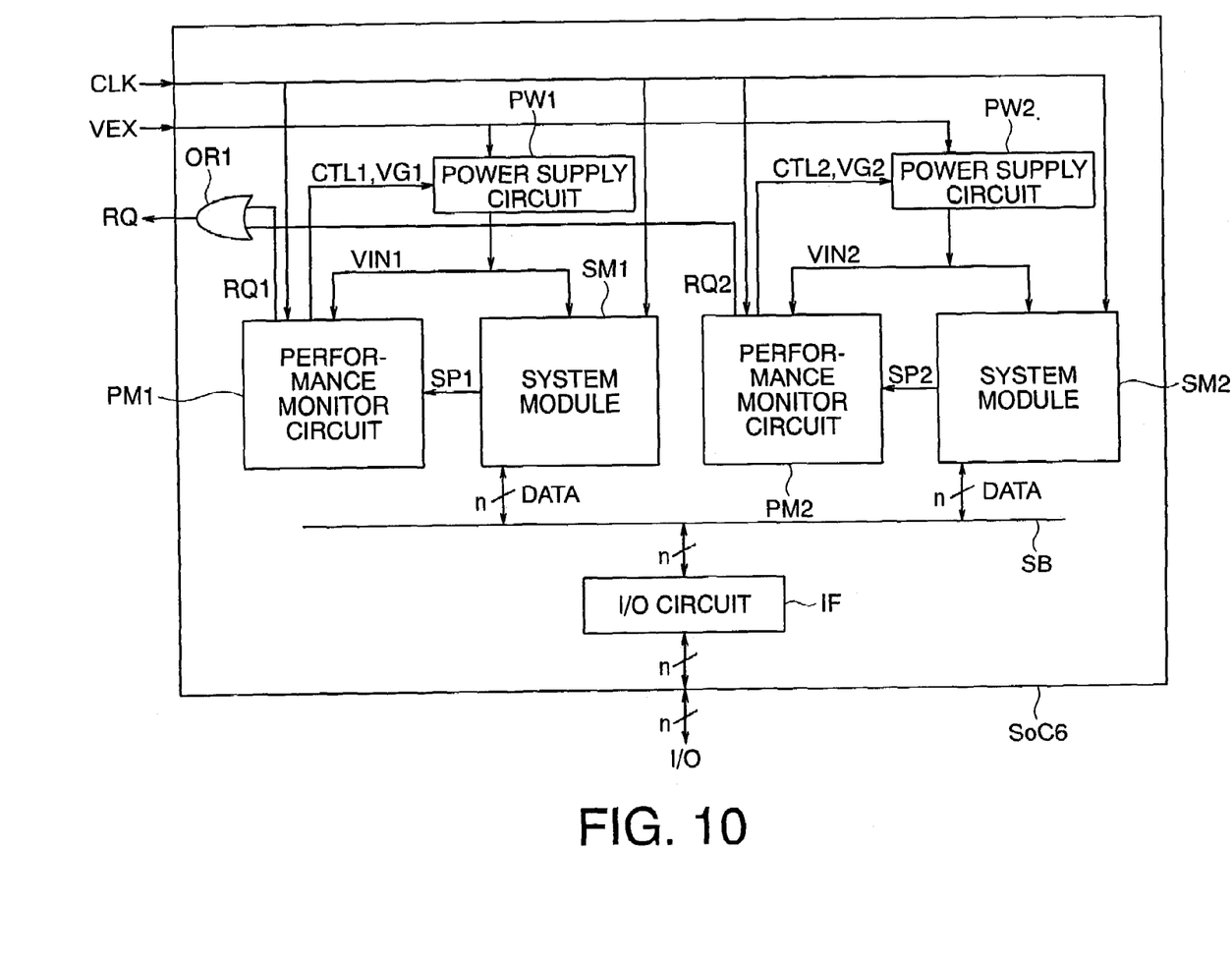
FIG. 10 is a block diagram showing the arrangement of a semiconductor device according to the sixth embodiment of the present invention.

A semiconductor device according to the sixth embodiment of the present invention will be described below with reference to FIG. 10.

The sixth embodiment differs from the fifth embodiment in that system modules SM1 and SM2 generate processing speed control signals SP1 and SP2, respectively.

The system module SM1 sets a processing speed necessary to execute an applied command, and supplies the processing speed control signal SP1 to a performance monitor circuit PM1. Likewise, the system module SM2 sets a processing speed necessary to execute an applied command, and supplies the processing speed control signal SP2 to a performance monitor circuit PM2.

As described above, the system modules SM1 and SM2 generate the processing speed control signals SP1 and SP2 for realizing necessary processing speeds, in accordance with applied commands, and output the processing speed control signals SP1 and SP2 to the performance monitor circuits PM1 and PM2, respectively.

On the basis of the supplied processing speed control signal SP1, the performance monitor circuit PM1 outputs internal power control signals CTL1 and VG1 to a power supply circuit PW1, and an external power adjusting signal RQ1 to an OR circuit OR1. On the basis of the supplied processing speed control signal SP2, the performance monitor circuit PM2 outputs internal power control signals CTL2 and VG2 to a power supply circuit PW2, and an external power adjusting signal RQ2 to the OR circuit OR1. Of the input external power adjusting signals RQ1 and RQ2, the OR circuit OR1 outputs a signal requiring a higher external power supply voltage VEX to the outside as an external power adjusting signal RQ.

In the sixth embodiment, therefore, it is possible to generate the internal power supply voltages VIN1 and VIN2 corresponding to applied commands in the system modules SM1 and SM2, respectively, and thereby ensure the necessary processing speeds and reduce the power consumption.

(7) SEVENTH EMBODIMENT

Figure 11:
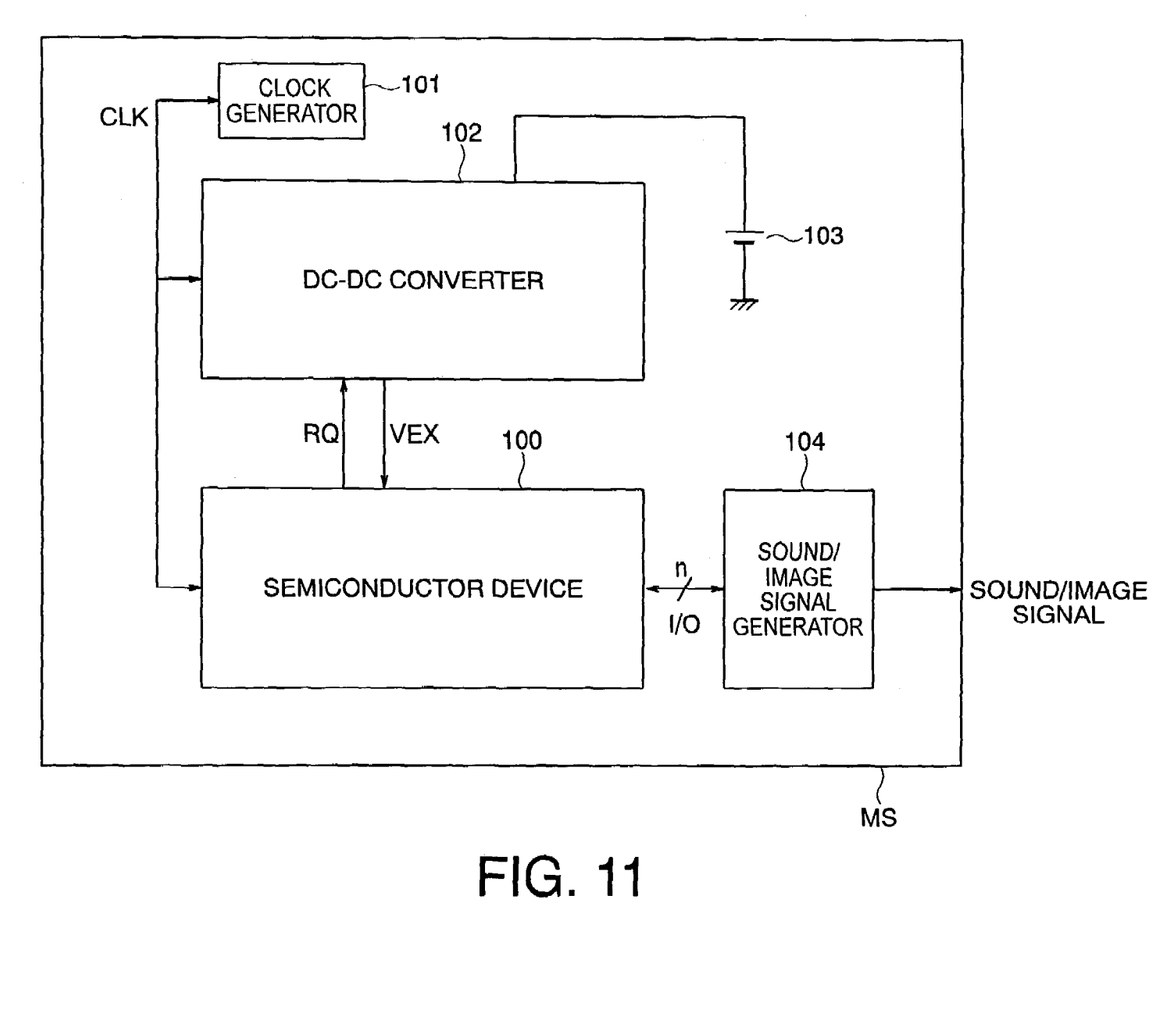
FIG. 11 is a block diagram showing the arrangement of a semiconductor device according to the seventh embodiment of the present invention.

The seventh embodiment of the present invention will be described below with reference to FIG. 11 showing the arrangement of the embodiment.

The seventh embodiment is a multimedia system MS including a semiconductor device 100 which is one of the semiconductor devices SoC1 to SoC6 of the first to sixth embodiments described above.

This system comprises a clock generator 101 which generates a clock CLK, a power supply 103 which is a battery or the like, a DC-DC converter 102 which generates an external power supply voltage VEX to be applied to the semiconductor device 100 by using the voltage applied from the power supply 103 and the clock CLK, the semiconductor device 100 to which the external power supply voltage VEX and clock CLK are supplied, and a sound/image signal generator 104 which converts an output from the semiconductor device 100 into a sound signal/image signal and outputs the signals outside the system.

Similar to the semiconductor devices SoC1 to SoC6 of the first to sixth embodiments, the semiconductor device 100 generates an external power adjusting signal RQ which requests a change of the external power supply voltage VEX, and applies the external power adjusting signal RQ to the DC-DC converter 102.

On the basis of the external power adjusting signal RQ, the DC-DC converter 102 adjusts the level of the external power supply voltage VEX.

The seventh embodiment which uses one of the semiconductor devices SoC1 to SoC6 according to the first to sixth embodiments can ensure the necessary processing speed and reduce the power consumption.

In the semiconductor devices of the first to sixth embodiments and the system of the seventh embodiment, it is possible to assure the necessary processing speed and reduce the power consumption.

Each of the above embodiments is merely an example and does not limit the present invention, so these embodiments can be variously modified within the technical scope of the present invention. For example, in each embodiment, the unit of adjustment of the internal power supply voltage VIN is 50 mV. However, the adjustment unit is not limited to this value, and the adjustment may also be performed by a smaller or larger voltage unit where necessary.

Also, each of the above embodiments uses the two modules SM1 and SM2 or the three modules SM1 to SM3.

However, it is only necessary to use at least one system module, and the number of system modules may also be four or more.

What is claimed is:

1. A semiconductor device comprising:
   a first power supply circuit which receives an external power supply voltage supplied, and outputs a first internal power supply voltage not higher than the external power supply voltage;
   a second power supply circuit which receives the external power supply voltage supplied, and outputs a second internal power supply voltage not higher than the external power supply voltage;
   a first system module which receives the first internal power supply voltage, and performs a predetermined operation;
   a second system module which receives the second internal power supply voltage, and outputs a processing speed control signal for requesting a processing speed to be realized by said first system module;
   a first performance monitor circuit which measures a processing speed of said first system module when the first internal power supply voltage is applied, and outputs a (1A)th control signal which requests to set the external power supply voltage at a (1A)th level, and a (2A)th control signal which requests said first power supply circuit to set the first internal power supply voltage at a (2A)th level, such that the measured processing speed is not lower than the processing speed requested by the processing speed control signal;
   a second performance monitor circuit which measures a processing speed of said second system module when the second internal power supply voltage is applied, and, on the basis of the measured processing speed, outputs a (1B)th control signal which requests to set the external power supply voltage at a (1B)th level, and a (2B)th control signal which requests said first power supply circuit to set the second internal power supply voltage at a (2B)th level; and
   a selector which receives the (1A)th and (2A)th control signals, selects one of the (1A)th and (2A)th control signals which requests a higher external power supply voltage, and outputs the selected control signal as a first control signal,
   wherein said first power supply circuit outputs the first internal power supply voltage having the (2A)th level on the basis of the (2A)th control signal applied thereto, and said second power supply circuit outputs the second internal power supply voltage having the (2B)th level on the basis of the (2B)th control signal applied thereto.

2. The device according to claim 1, further comprising:
   a clock generator which generates and outputs a clock to the semiconductor device;
   a third power supply circuit which outputs a first power supply voltage; and
   a DC-DC converter which receives the first power supply voltage and the first control signal output from the semiconductor device, and generates and outputs the external power supply voltage to the semiconductor device.

* * * * *